United States Patent [19]

Hara

[11] Patent Number: 5,652,788
[45] Date of Patent: Jul. 29, 1997

[54] KEY TELEPHONE APPARATUS

[75] Inventor: Masahiko Hara, Machida, Japan

[73] Assignee: Kabushiki Kaisha Toshiba, Kanagawa-Ken, Japan

[21] Appl. No.: 650,030

[22] Filed: May 17, 1996

Related U.S. Application Data

[63] Continuation of Ser. No. 317,613, Sep. 29, 1994, abandoned.

[30] Foreign Application Priority Data

Sep. 29, 1993 [JP] Japan .................................. 5-243139

[51] Int. Cl.[6] .............................. H04M 3/22; H04M 1/00
[52] U.S. Cl. ........................... 379/156; 379/34; 379/157; 379/164; 379/165; 379/166
[58] Field of Search ................................ 379/34, 35, 156, 379/157, 164, 165, 166, 265, 266, 309

[56] References Cited

U.S. PATENT DOCUMENTS

| | | | |
|---|---|---|---|
| 4,449,017 | 5/1984 | Burke | 379/309 |
| 4,510,351 | 4/1985 | Costello | 379/36 |
| 4,694,483 | 9/1987 | Cheung | 379/164 |
| 4,763,353 | 8/1988 | Canale | 379/266 |
| 4,881,261 | 11/1989 | Oliphant | 379/266 |
| 4,893,325 | 1/1990 | Pankonen | 379/265 |
| 4,951,310 | 8/1990 | Honda | 379/309 |
| 4,953,204 | 8/1990 | Cuschleg | 379/309 |
| 5,185,782 | 2/1993 | Srinivasan | 379/266 |
| 5,299,260 | 3/1994 | Shaio | 379/265 |
| 5,309,505 | 5/1994 | Szlam | 379/265 |
| 5,309,513 | 5/1994 | Rose | 379/266 |
| 5,327,490 | 7/1994 | Cave | 379/266 |
| 5,371,785 | 12/1994 | Marcinkiewicz | 379/265 |
| 5,392,346 | 2/1995 | Hassler | 379/265 |
| 5,461,668 | 10/1995 | Zdenek | 379/265 |

OTHER PUBLICATIONS

"Quality Must be Seen & Heard" by Steve McNamara, Dec. 1989, pp. 66–67.
"Getting the Home Field Advantage" by Heller, Oct. 1989, pp. 20–40.

Primary Examiner—Curtis Kuntz
Assistant Examiner—Vijay Shankar
Attorney, Agent, or Firm—Finnegan, Henderson, Farabow, Garrett & Dunner, L.L.P.

[57] ABSTRACT

One of the internal key telephone sets coupled to a key telephone apparatus capable of automatic call distribution operates as a supervisor and other operate as agents. Under the automatic call distribution, the statuses of the agents and their number are stored in a memory. The stored statuses of the agents are informed to the supervisor. Each key telephone set has a display unit. When one of the key telephone sets operates as the supervisor, the informed statuses and their number are displayed on the display unit of the supervisor. With identification data of a specific agent, the status of the specific agent is displayed on the display unit of the supervisor. To operate one of the key telephone sets as the supervisor and other the agents, first, a password is entered from one of the key telephone sets. The input password is compared with a first reference password for the supervisor and with a second reference password for the agents. When the input password is equivalent to the first password, the telephone set is registered as the supervisor. On the other hand, when equivalent to the second password, the telephone set is registered as the agent.

10 Claims, 7 Drawing Sheets

FIG.1

|   | MESSAGE | STATUS |
|---|---|---|
| 1 | AVAIL | AGENT LOG IN AND READY FOR ACD CALL |
| 2 | NOT AVAIL | AGENT LOG IN BUT REJECT ACD CALL |
| 3 | AFTER CALL | AFTER ANSWERING ACD CALL, REJECT NEX ACD CALL |
| 4 | ACD RING | AGENT RINGING TO ACD CALL |
| 5 | ACD CALL | AGENT ANSWERING ACD CALL |
| 6 | PBX RING | AGENT RINGING TO CALL EXCEPT ACD CALL |
| 7 | PBX CALL | AGENT ANSWERING CALL EXCEPT ACD CALL |
| 8 | LOG OUT | AGENT LOG OUT |

FIG.2

| FLAG INDICATING STATUS | STATUS |
|---|---|
| 1 | AVAIL |
| 2 | AVAIL |
| 3 | ACD RING |
| ... | ... |
| n - 3 | AVAIL |
| n - 2 | ACD CALL |
| n - 1 | LOG OUT |
| n | PBX RING |

NUMBER ⎵ OF ⎵ AGENT ⎵
⎵ LOGGED ⎵ IN ⎵ : ⎵ 09

ID ⎵ 0011/NO.00205
STAT : AVAIL

KEY TELEPHONE APPARATUS

This application is a continuation of application Ser. No. 08/317,613 filed Sep. 29, 1994, now abandoned.

BACKGROUND OF THE INVENTION

The present invention relates to a key telephone apparatus, particularly, a key telephone apparatus capable of automatic call distribution (ACD).

There has been a key telephone apparatus capable of automatic call distribution for distributing calls to key telephone sets coupled to the key telephone apparatus and supervising the key telephone sets for answering the calls.

In general, a management information system for automatic call distribution is connected to the key telephone apparatus via a connection unit. However, since the key telephone apparatus supervises the key telephone sets based on information sent from the management information system, the space occupied by the key telephone apparatus becomes large. Moreover, the cost of entire apparatus increases because the connection unit is also needed besides the key telephone apparatus and the management information system.

Furthermore, the management information system needs a cathode ray tube for displaying the status of the key telephone sets in automatic call distribution mode (ACD mode). Moreover, setting up the management information system for the ACD mode is complicated.

SUMMARY OF THE INVENTION

Therefore, in order to overcome the disadvantages described above, it is an object of the present invention to provide a key telephone apparatus having internal key telephone sets in which any one of the key telephone sets can supervise other key telephone sets (agents) in automatic call distribution.

The present invention provides a key telephone apparatus to which a plurality of internal key telephone sets are coupled, the apparatus being capable of automatic call distribution under which calls are distributed to the key telephone sets, the apparatus comprising: control means for operating one of the key telephone sets as a supervisor telephone and other key telephone sets as agent telephones to be supervised by the supervisor telephone; a memory that stores statuses of the agent telephones under the automatic call distribution; and informing means for informing the supervisor telephone of the stored status of the agent telephones.

Each key telephone set may have a display. In this case, the statuses of the agent telephones informed by the informing means are displayed on the display of the supervisor telephone.

The present invention further comprises a method of controlling a key telephone apparatus to which a plurality of internal key telephone sets are coupled, the apparatus being capable of automatic call distribution under which calls are distributed to the key telephone sets, the method comprising the steps of: operating one of the key telephone sets as a supervisor telephone and other key telephone sets as agent telephones; storing statuses of the agent telephones under the automatic call distribution; and informing the supervisor telephone of the stored statuses of the agent telephones.

The control method may have a step of displaying the statuses of the agent telephones may be displayed on a display of the supervisor telephone. In addition to the display step, the control method comprises steps of: reading out a specific number of the agent telephones whose statuses are stored; and displaying the read out number of the agent telephones on the display of the supervisor telephone.

Furthermore, the control method may comprise steps of: entering identification data of a specific telephone set among the agent telephone sets; and displaying the status of the specific telephone set on the display of the supervisor telephone in response to the identification data.

Furthermore, the operating step may comprise: entering a password from one of the plurality of key telephone sets; comparing the input password with a first reference password for the supervisor telephone and with a second reference password for the agent telephones; registering the one of the key telephone sets as the supervisor telephone when the input password is equivalent to the first reference password, whereas as the agent telephone when the input password is equivalent to the second reference password.

DETAILED DESCRIPTION OF THE PREFERRED EMBODIMENTS

Figure 1:
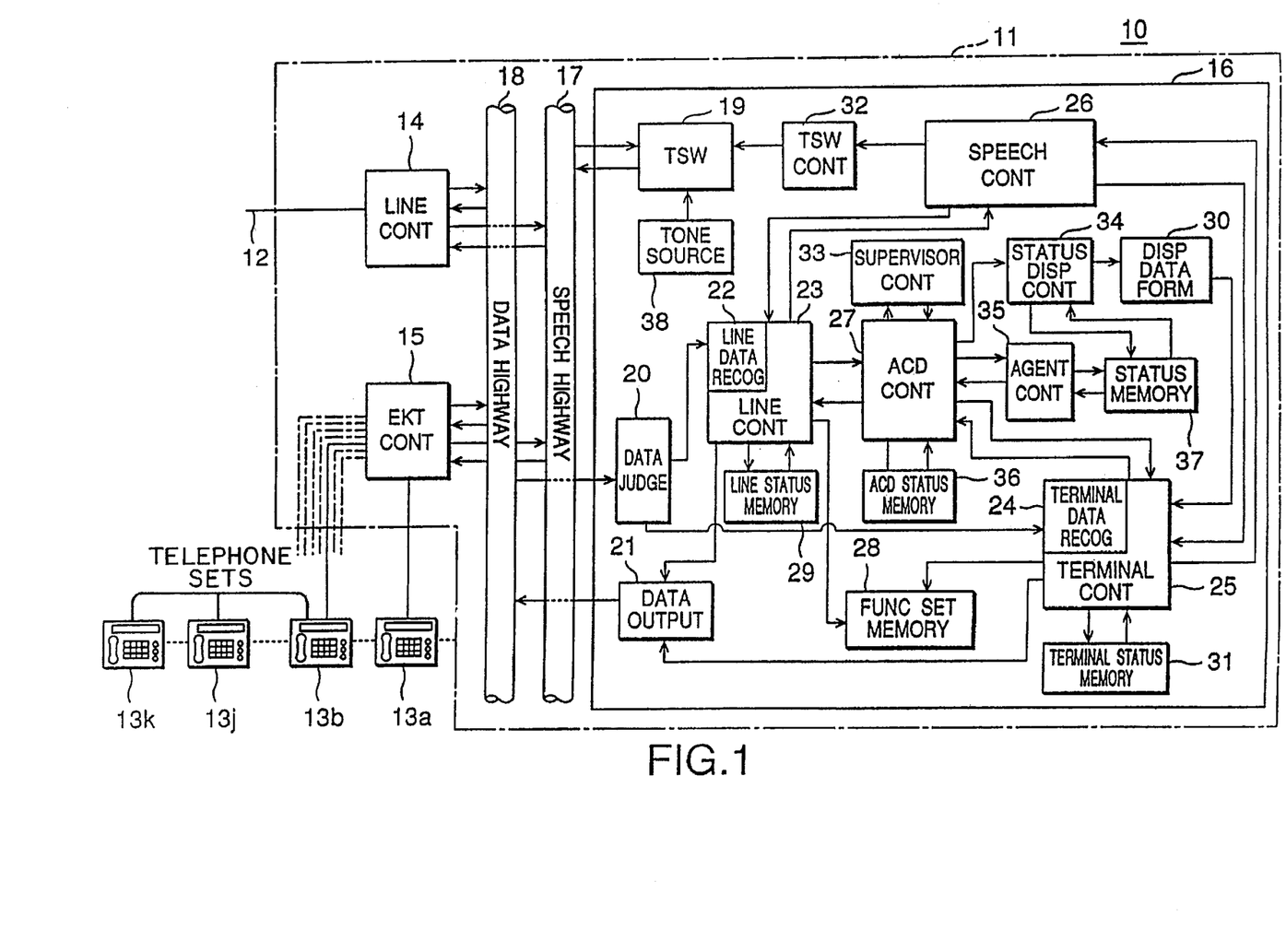
FIG. 1 is a block diagram of a key telephone apparatus of the present invention.

FIG. 1 shows a key telephone apparatus 10 of the present invention provided with a key service unit (KSU) 11. A call generated by an external telephone set (not shown) is sent on a line 12 to KSU 11.

The key service unit 11 is provided with a plurality of internal electric key telephone set terminals (EKTs) 13a to 13k. Communication is made among the internal key telephone sets or between them and external key telephone sets (not shown).

The key service unit 11 is further provided with a line control unit 14, a key telephone set (EKT) control unit 15 and a main control unit (MCU) 16. Data is sent from MCU 16 to the line control unit 14 and EKT control unit 15 via a speech highway 17 and a data highway 18, vise versa.

A call signal and control data generated by an external key telephone set are sent on the line 12 connected to line control unit 14 to MCU 16 via speech highway 17 and data highway 18. Also sent to MCU 16 via these highways are call signals and control data generated by EKTs 13a to 13k connected to the EKT control unit 15.

The main control unit 16 is provided with a time switch 19, a data judging section 20 and a data output section 21 for receiving and transmitting the call signal and control data generated by an external telephone set.

The data judging section 20 is connected to the data highway 18 and judges whether control data sent via data highway 18 is data from EKTs 13a to 13k or from the external telephone set.

The data judging section 20 is also connected to a line control section 23 provided with a line data recognition section 22 and a terminal control section 25 provided with a terminal data recognition section 24.

When data is judged as control data from the external telephone set by the data judging section 20, the control data is sent to the line control section 23. On the other hand, when data is judged as control data from EKTs 13a to 13k, the control data is sent to the terminal control section 25.

Connected to the line control section 23 are a speech control section 26, an automatic call distribution (ACD) control section 27 and a function set memory 28, a line status memory 29 and the data output section 21. The line control section 23 controls these sections based on the control data sent via line 12.

The speech control section 26, ACD control section 27, function set memory 28 and data output section 21 are further connected to the terminal control section 25. And also connected to the terminal control section 25 are a display data forming section 30 and a terminal status memory 31. The terminal control section 25 controls these sections based on the control data sent from EKTs 13a to 13k.

The time switch 19 is connected to the speech control section 26 via time switch control section 32. Based on the control data sent via line 12 or from EKTs 13a to 13k, the speech control section 26 controls the time switch 19 to make communication among external telephone sets, between external and internal telephone sets and among internal telephone sets.

Connected to the ACD control section 27 are a supervisor control section 33, a status display control section 34, an agent control section 35, the terminal control section 25 and an ACD status memory 36 to execute ACD mode. A status memory 37 is connected to the agent control section 35 to store the status of agents which will be described later. Here, an EKT which supervises EKTs in ACD mode is called a supervisor. On the other hand, those EKTs supervised by the supervisor are called agents.

Connected to the status display control section 34 are the display data forming section 30 and the status memory 37. Based on control by the ACD control section 27, the display data forming section 30 forms display data and the status memory 37 stores the display data.

A tone source 38 is connected to the time switch 19 to send a calling tone, etc., to EKTs 13a to 13k based on speech channel forming data generated by the time switch 19.

Connected to the data output section 21 via data highway 18 are the line control unit 14 and EKT control unit 15. The data output section sends line control data and terminal control data to these units, respectively.

The line control unit 14 and EKT control unit 15 are further connected to the time switch 19 via speech highway 17. The time switch 19 sends a call signal to external or internal key telephone set.

The following disclosure with reference to FIGS. 2 to 8 is for the case where EKT 13a supervises other EKTs 13b to 13k in ACD mode.

When EKTs 13b to 13k are put into ACD mode, entry data is sent to the ACD control section 27 via EKT control unit 15, data highway 18, data judging section 20 and terminal control section 25. The entry data is further sent to the status memory 37 via agent control section 35 and hence the status memory 37 stores the entry data indicating that EKTs 13b to 13k are put into ACD mode.

Figure 2:
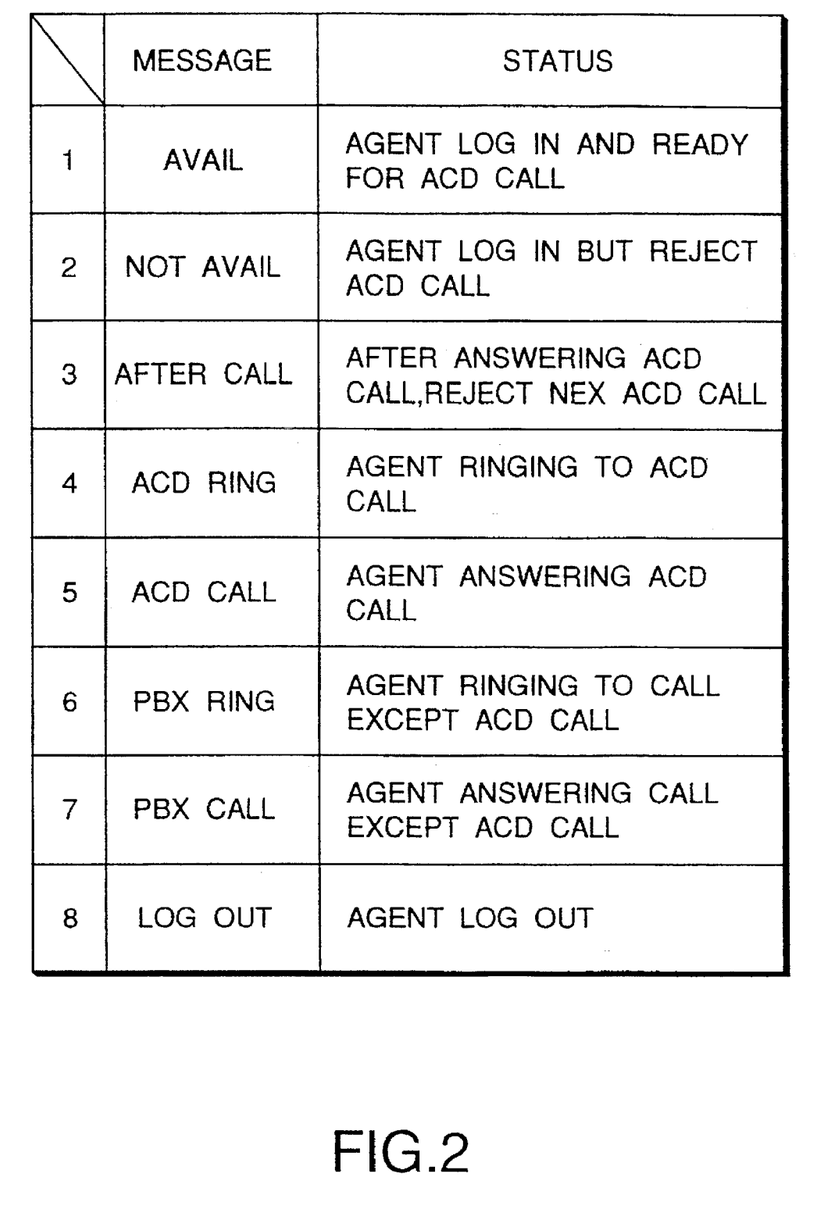
FIG. 2 is an illustration of information stored in a status memory of the key telephone apparatus of FIG. 1.

Examples of entry data of an EKT, such as EKT 13b, stored in the status memory 37 are shown in FIG. 2. The following is an explanation of some entry data.

(1). "AVAIL" This indicates that EKT 13b, enters the ACD mode (AGENT LOG IN) and is ready for answering a call in ACD mode (ACD call);

(2). "NOT AVAIL" This indicates that EKT 13b is put into ACD mode (AGENT LOG IN) as an agent but rejects an ACD call; and (3). "AFTER CALL" This indicates that, after answering an ACD call, EKT 13b rejects next ACD call for a predetermined time period.

When the key telephone apparatus 10 accepts a call from an external EKT (not shown), the call signal is sent to the ACD control section 27 via line control unit 14, data highway 18 and data judging section 20. The ACD control section 27 makes data communication with the function set memory 28 via terminal control section 25.

The terminal control section 25 generates a call control command signal which is then sent to EKT 13b whose status is "AVAIL" shown in FIG. 2 via data output section 21, data highway 18 and EKT control section 27 to control ACD call. Under ACD call control, EKT 13b changes its status from "AVAIL" to "ACD RING" shown in FIG. 2.

The ACD control section 27 sends the call control command signal to the status memory 37 via agent control section 35. The status memory 37 stores information indicating that EKT 13b is now "ACD RING" status (EKT 13b is ringing.).

Figure 3:
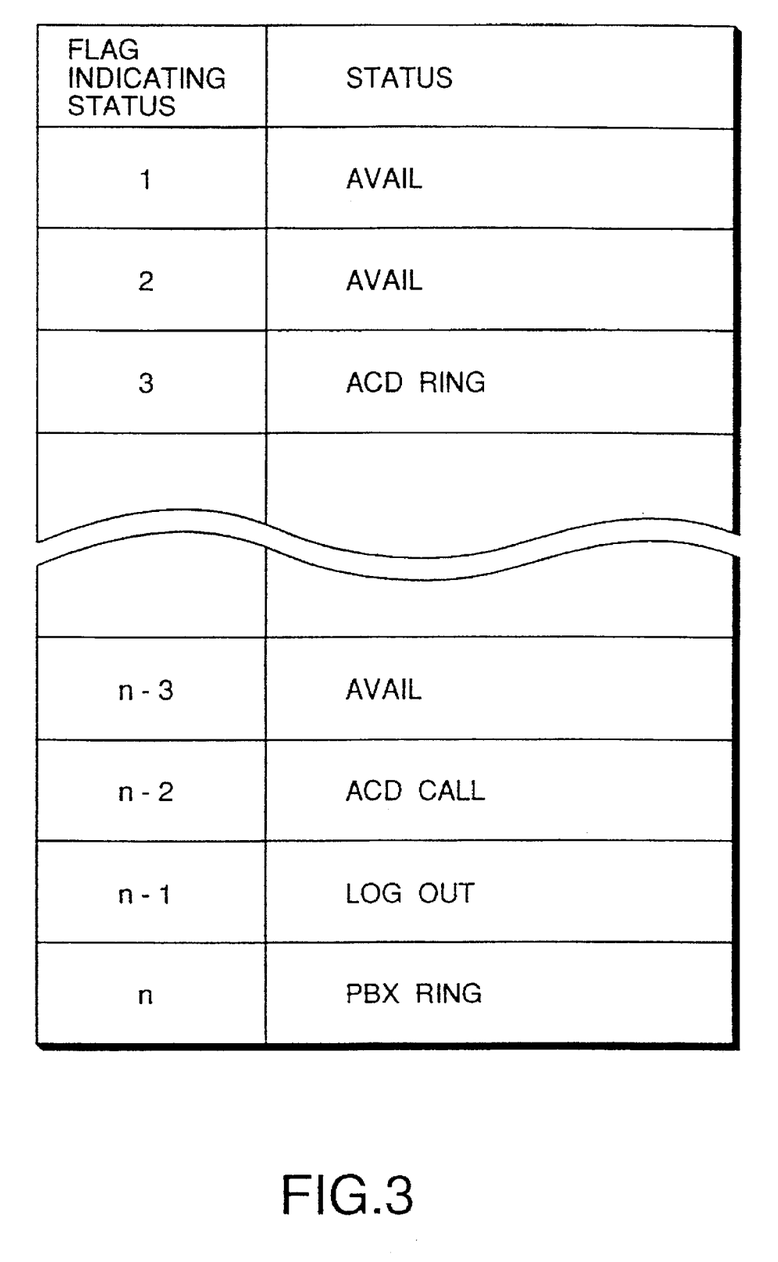
FIG. 3 is another illustration of information stored in a status memory of the key telephone apparatus of FIG. 1.
Figure 4:
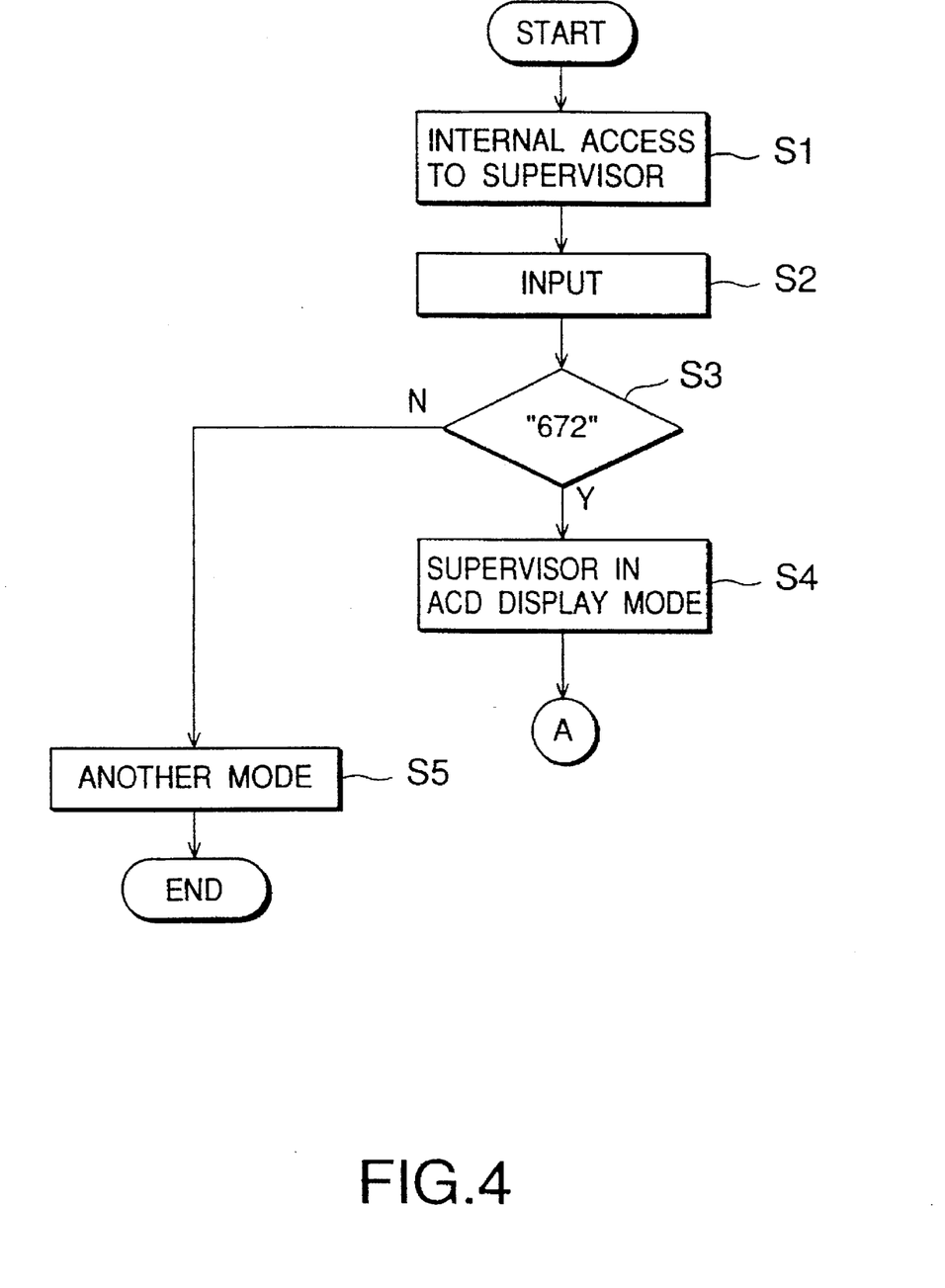
FIG. 4 is a flowchart of a supervising process of the key telephone apparatus of FIG. 1.

As described above, any time EKT 13b changes its status, the status memory 37 stores information, such as, "AFTER CALL", "ACD CALL", "PBX CALL" and "LOG OUT". The status memory 37 also stores the same information with respect to other EKTs using flag indication as shown in FIG. 3.

The following explanation is for the case where EKT 13a is set up as a supervisor to watch over EKTs 13b to 13k. First, internal access is made to EKT 13a with respect to ACD mode (step S1 of FIG. 4). The number, for example, "672" is entered into EKT 13a (step S2). If this entry is accepted (step S3), EKT 13a is made in a status of ACD display mode (step S4). On the other hand, if not accepted (step S3), EKT 13a is put into another mode (step S5).

Figure 6:
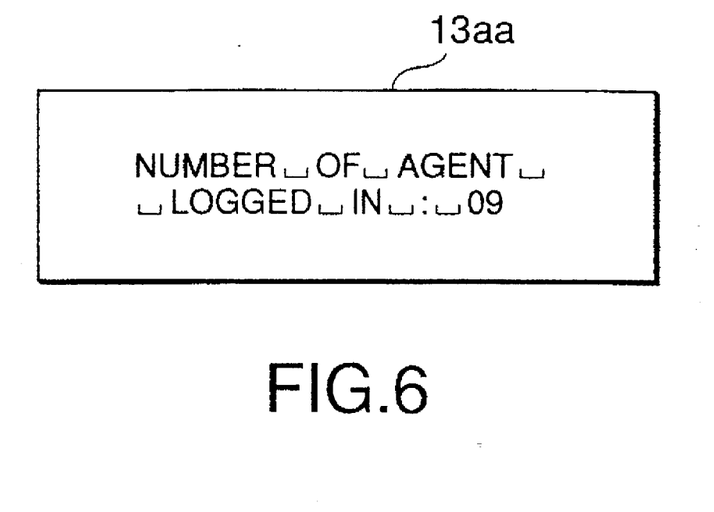
FIG. 6 is an illustration of information displayed on a supervising key telephone set (supervisor)

When EKT 13a is put into ACD display mode, EKT 13a sends mode data to the ACD control section 27 via EKT control section 15, data highway 18, data judging section 20 and terminal control section 25. The ACD control section 27 sends the mode data to the status display control section 34 which then reads out the number of EKTs 13b to 13k put into ACD mode from the status memory 37 and sends the number data to the display data forming section 30. Based on the number data, the display forming section 30 forms initial display data as shown in FIG. 6.

The initial display data is sent to EKT 13a (supervisor) via data output section 21, data highway 18, EKT control section 15. Then, the number, such as "9" (the number of EKTs 13b to 13k) is displayed on a display section 13aa of EKT 13a as shown in FIG. 6 (step S11 of FIG. 5).

Figure 5:
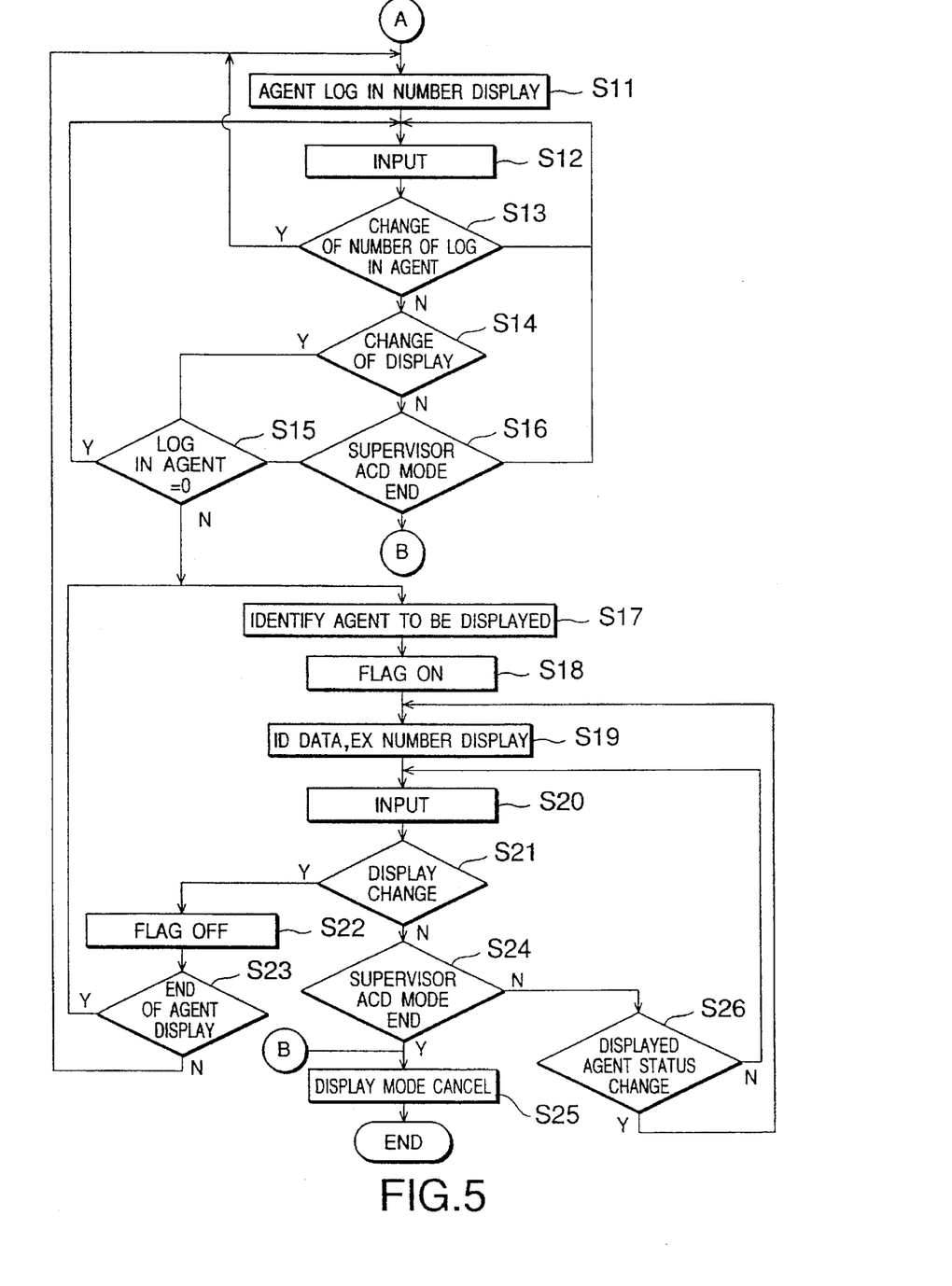
FIG. 5 is another flowchart of a supervising process of the key telephone apparatus of FIG. 1.

If there is another entry data for ACD mode (step S12), and also change of the number of agents put into ACD mode (step S13), EKT 13a is again put into to display mode (step S11).

There is a case that display change data is sent from EKT 13a (step S12) with change of display (step S14) but without change of the number of agents (step S13). If EKT 13j has already been put into ACD mode as an agent (step S15), EKT 13j is identified as an agent whose status is to be displayed on EKT 13a (step S17).

Furthermore, when ACD mode end data is sent from EKT 13a (step S12), the process proceeds to step S16. If the ACD mode end data is accepted (step S16), the process goes back to waiting mode (step 12).

The process proceeds from step S17 to step S18 where a flag is on that indicates a memory field "n-3" of memory area of the status memory 37 (FIG. 3) corresponding to EKT 13j. When ID data, such as, "0011" and also an extension number, such as, "00205" of EKT 13j are entered, the content of "AVAIL" corresponding to EKT 13j is read out from the status memory 37 where its flag is on (step S19). This read out data is sent to the display data forming section 30 as described above to form status display data with respect to EKT 133. The status display data is then sent to the terminal control section 25.

Figure 7:
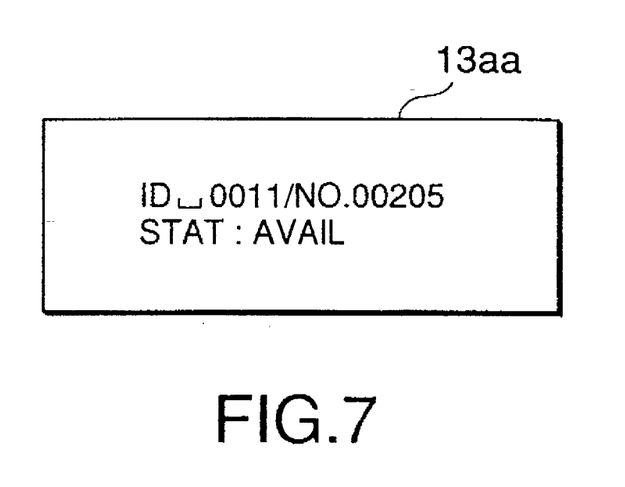
FIG. 7 is another illustration of information displayed on the supervisor.

The terminal control section 25 send the status display data to the display section 13aa of EKT 13a via data output section 21 and EKT control unit 15. The data is displayed on the display section 13aa as shown in FIG. 7. Using this display, the status of EKT 13j is observed and supervised by EKT 13a.

Now, the process proceeds to step S20 where, if there is need to change display from EKT 133 to EKT 13k, the display flag of the status memory 37 is off (step S22). In response to flag off, end of display with respect to EKT 13j is acknowledged (step S23), the display is changed from EKT 13j to EKT 13k (step S17). The process for EKT 13k is the same as that for EKT 13j described above.

When EKT 13a completes ACD mode (step 20) and which is acknowledged (step S24), status display mode is canceled (step S25). On the other hand, if not acknowledged (step 24), it is judged whether the status of an agent, such as EKT 13k, can be changed (step S26). If the status can be changed, the process goes back to step S19 to repeat entry of ID data and an extension number, whereas if the status cannot be changed, the process goes back to step S20.

Figure 8:
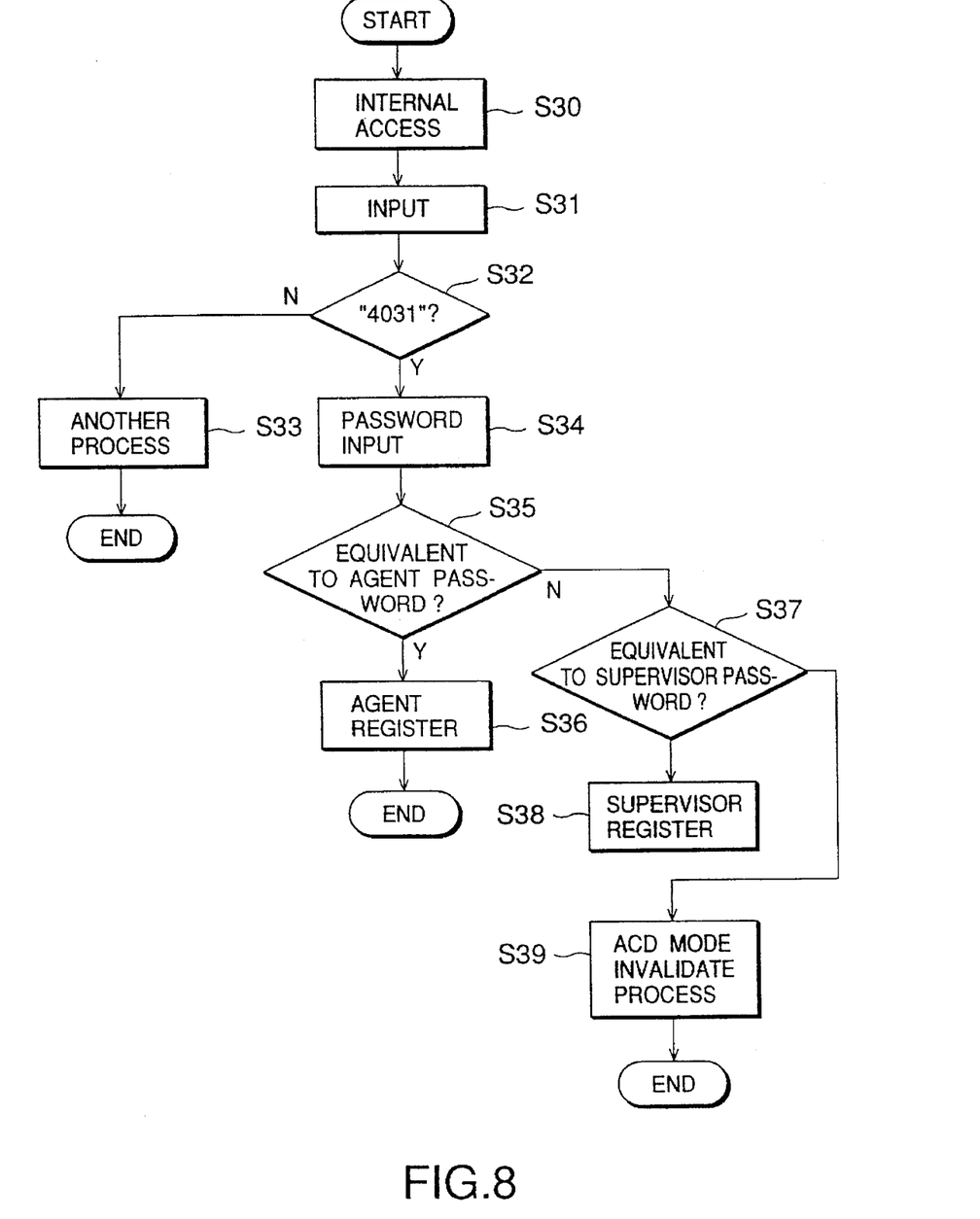
FIG. 8 is a flowchart of a process of putting key telephone sets into ACD mode.

Next, the process to put an EKT into ACD mode as a supervisor or an agent will be described with respect to FIG. 8.

First, an internal access to the key telephone apparatus 11 is made from, for example, EKT 13a (step S30). Then after waiting for input (step S31), a number, such as "4031" is entered (step S32). This number signal is sent from EKT 13a to the terminal control section 25 via EKT control unit 15, data highway 18, data judging section 20 and terminal data recognition section 24. If the number "4031" is not entered (step S32), another process besides ACD mode will proceed (step S33).

The terminal control section 25 acknowledges that EKT 13a is ready for entering a password for ACD mode (step 34). When the password is entered and sent to the terminal control section 25, this input password is first compared with an agent password stored in the function set memory 28 (step S35). If equivalent to the agent password, the terminal control section 25 informs the ACD function control section 27 that EKT 13a is put into ACD mode as an agent. The ACD function control section 27 then registers EKT 13a as the agent to the ACD status memory 36 (step S36).

On the other hand, If the input password is not equivalent to the agent password (step S35), the terminal control section 25 compares the input password with a supervisor password stored in the function set memory 28 (step S37). If equivalent to the supervisor password, the terminal control section 25 informs the ACD function control section 27 that EKT 13a is put into ACD mode as a supervisor, the ACD function control section 27 then registers EKT 13a as the supervisor to the ACD status memory 36 (step S38).

Furthermore, If the input password is not equivalent to the supervisor password (step S37), the process proceeds to ACD mode invalidate process (step S39).

As described above, it is possible to put EKTs 13a to 13k of FIG. 1 into ACD mode as a supervisor or an agent.

From the foregoing disclosure, according to the present invention, any one of EKTs 13a to 13k of FIG. 1 can be a supervisor in ACD mode. Therefore, the key telephone apparatus of the present invention can be made simple in structure and in process to execute ACD mode and so the cost of the entire apparatus will decrease. Because, there is no need to have a system, such as, the management information system used in a conventional key telephone apparatus.

What is claimed is:

1. A key telephone apparatus having a key service unit and a plurality of internal key telephone sets coupled to the key service unit, the key service unit being capable of automatic call distribution under which calls are distributed to the key telephone sets, the key telephone apparatus comprising:

input means, provided in at least one of the key telephone sets, for inputting a password into the key service unit;

control means, provided in the key service unit, responsive to the input password, for comparing the input password entered with a reference password for a supervisor telephone, and, when both passwords are equal to each other, the control means operating the one of the key telephone sets as the supervisor telephone and other key telephone sets as agent telephones to be supervised by the supervisor telephone;

a memory that stores the statuses of the agent telephones under the automatic call distribution; and informing means for informing the supervisor telephone of the stored statuses of the agent telephones.

2. The key telephone apparatus according to claim 1, wherein each key telephone set comprises a display, the statuses of the agent telephones informed by the informing means being displayed on the display of the supervisor telephone.

3. A method of controlling a key telephone apparatus having a key service unit and a plurality of internal key telephone sets coupled to the key service unit, the key service unit being capable of automatic call distribution under which calls are distributed to the key telephone sets, the method comprising the steps of:

inputting a password from at least one of the key telephone sets into the key service unit;

comparing the input password entered with a reference password for a supervisor telephone held by the key service unit;

operating with the key service unit, when both passwords are equal to each other, the one of the key telephone sets as the supervisor telephone and other key telephone sets as agent telephones to be supervised by the supervisor telephone;

storing statuses of the agent telephones under automatic call distribution; and informing the supervisor telephone of the stored statuses of the agent telephones.

4. The control method according to claim 3 further comprises a step of displaying the statuses of the agent telephones on a display of the supervisor telephone.

5. The control method according to claim 4, further comprises steps of:

reading out a specific number of the agent telephones whose statuses are stored; and displaying the read out number of the agent telephones on the display of the supervisor telephone.

6. The control method according to claim 3 further comprises steps of:

entering identification data of a specific telephone set among the agent telephone sets; and displaying the status of the specific telephone set on the display of the supervisor telephone in response to the identification data.

7. The control method according to claim 3, wherein the operating step comprises the steps of:

comparing the input password with another reference password for the agent telephones;

registering the one of the key telephone sets as the supervisor telephone when the input password is equivalent to the reference password for the supervisor telephone, and as an agent telephone when the input password is equivalent to the other reference password for the agent telephones.

8. The key telephone apparatus according to claim 1, wherein the control means comprises means for comparing the input password with another reference password for the agent telephones and registering the one of the key telephone sets as the supervisor telephone when the input password is equivalent to the reference password for the supervisor telephone, and as an agent telephone when the input password is equivalent to the other reference password for the agent telephones.

9. The key telephone apparatus according to claim 2, wherein the memory further stores a specific number of the agent telephones to be supervised by the supervisor telephone and the informing means informs the supervisor telephone of the number of the agent telephones to be supervised, the number being displayed on the display of the supervisor telephone.

10. The key telephone apparatus according to claim 2, wherein the informing means informs the supervisor telephone of a status of a specific telephone among the agent telephones in response to identification data of the specific telephone entered from the supervisor telephone, the status of the specific telephone being displayed on the display of the supervisor telephone.

* * * * *